United States Patent [19]

Schwaerzler et al.

[11] 4,161,300
[45] Jul. 17, 1979

[54] CANARD TYPE AIRCRAFT

[75] Inventors: Hans Schwaerzler, Taufkirchen; Werner Staudacher, Zorneding, both of Fed. Rep. of Germany

[73] Assignee: Messerschmitt-Bolkow-Blohm GmbH, Munich, Fed. Rep. of Germany

[21] Appl. No.: 859,685

[22] Filed: Dec. 12, 1977

[30] Foreign Application Priority Data

Dec. 15, 1976 [DE] Fed. Rep. of Germany ....... 2656692

[51] Int. Cl.² .......................... B64C 5/04; B64C 5/10
[52] U.S. Cl. ..................... 244/45 A; 244/46; 244/214; 244/90 R
[58] Field of Search .................. 244/15, 46, 47, 48, 244/49, 45 A, 214, 87, 90 R

[56] References Cited

U.S. PATENT DOCUMENTS

| | | | |
|---|---|---|---|
| 2,783,956 | 3/1957 | Harriss | 244/48 |
| 2,981,504 | 4/1961 | Parker | 244/48 |
| 3,447,761 | 6/1969 | Whitener et al. | 244/46 |
| 3,478,989 | 11/1969 | Bielefeldt | 244/46 |
| 3,718,294 | 2/1973 | Krenz | 244/46 |

Primary Examiner—Galen L. Barefoot
Attorney, Agent, or Firm—W. G. Fasse; D. F. Gould

[57] ABSTRACT

The present canard type of aircraft comprises steering rudder elements which are tiltable substantially about the leading edge of each wing of the aircraft, whereby the respective edge of the rudder element extends alongside said leading edge of the respective wing. Another edge of the rudder element extends alongside a surface portion of the fuselage or body of the aircraft in close conformity with said surface portion, but movable relative thereto. A sealing may be inserted between the rudder element and the fuselage in such a manner that said movement is permitted.

7 Claims, 6 Drawing Figures

CANARD TYPE AIRCRAFT

BACKGROUND OF THE INVENTION

The present invention relates to canard type aircraft. More specifically, the present invention relates to aircraft having their steering mechanism arranged near the front end and integrated into the surface of the wing means, whereby the steering mechanism, or rather, the rudder elements thereof, are tiltable about an axis which forms an acute angle with the longitudinal axis of the aircraft fuselage or body. Such an aircraft is disclosed, for example, in U.S. Pat. No. 3,104,079. The aircraft suggested in said U.S. Pat. No. is characterized in that the tilting axis of the forward rudder mechanism extends outside the surface of the wing means or the tilting axis is located contiguous relative to the wing means, whereby the integration of the steering mechanism and the wing means is more of an aggregating nature rather than a true combination, the latter providing a synergistic result, whereas the former merely provides the sum of the individual effects.

In order to improve the flying characteristics of such aircraft, especially modern fighter aircraft, the wings thereof have been provided with smooth outlines or so-called sheers or strakes. The advantageous effect of such strakes resides especially in the fact that the excursion of the aerodynamic center of the aircraft is reduced and that in the range of subsonic speeds the start of the so-called buffeting has been shifted into higher speed ranges. These aerodynamic advantages, however, are achieved by additional weight. It is thus desirable, to make a more efficient use of the efforts connected with the provision of said sheers or strakes in order to improve the flying characteristics of such aircraft. Stated differently, it is desirable to make the so-called "strakes" movable and also reduce the weight thereof.

Examples of tiltable and slidable strakes are known which facilitate the trim of the aircraft and which are intended to influence the excursion of the aerodynamic center as a function of the flying speed. However, all of the prior art suggestions have not brought an additional benefit or efficiency worth mentioning in spite of having a good aerodynamic effect. The necessary structural input, so to speak, requires such a high weight that any aerodynamic benefit is again negated by such increased weight.

A further disadvantage of prior art devices is seen in that the sealing of the movable sheers or strakes relative to the fuselage, has frequently caused substantial difficulties. Besides, due to the large adjustment or displacement distances or tilting angles, rather small adjustment speeds may be accomplished. Thus, the prior art devices are not suitable for use as steering means.

OBJECTS OF THE INVENTION

In view of the above, it is the aim of the invention to achieve the following objects singly or in combination:

to avoid in aircraft equipped with adjustable strakes or steering devices, the above mentioned drawbacks, more specifically, to avoid additional weight in connection with such adjustable strakes;

to employ the strakes, or rather the rudder mechanism, in an aircraft of the above mentioned type as an active steering means;

to provide the rudder or steering device with a sealing means which is effective in all positions relative to the aircraft fuselage;

to reduce the number of required control or steering means for an aircraft;

to improve the rolling control of an aircraft; and to control the effect of the aileron in such a manner that its function is adapted to the speed of flight.

SUMMARY OF THE INVENTION

The above objects have been achieved according to the invention in a canard type of aircraft in which the front steering means have been integrated into the surface of the wing means, whereby the steering means are tiltable or rotatable about an axis which forms an acute angle with the longitudinal axis of the fuselage. This type of aircraft is characterized in that the steering means has two edges in the contact area with the aircraft structure, said edges including an obtuse angle ($\alpha$), whereby the rearwardly facing edge includes the rotational or tilting axis and forms an acute angle with the longitudinal axis of the aircraft fuselage. The other edge of the steering means conforms closely to the surface portion of the fuselage along which the other edge is movable. The other edge may extend substantially in parallel to the longitudinal axis of the fuselage. This type of arrangement provides a total integration of the steering means also referred to as strakes with the wing means of a canard type aircraft. Such integration has the advantage that the steering means in its zero position functions as a strake in an optimal manner while also being capable of acting as an elevator control means in a tilted position. In case the steering means or strakes are tilted in opposite directions on each wing, it is possible to effect a rolling control according to the invention.

The tilting or rotational axis of the steering means or strakes is to begin generally at a point corresponding substantially to the intersection of the leading edge of the wings and the outline of the strake or steering means. Starting from such point the rotational axis is to extend toward the fuselage with a respective inclination. This location of the tilting axis has the advantage that two aerodynamic effects may be utilized in combination, namely, the changing of the chamber and the changing of the incidence relative to the flow.

BRIEF FIGURE DESCRIPTION

In order that the invention may be clearly understood, it will now be described, by way of example, with reference to the accompanying drawings, wherein.

FIGS. 5a, b, c illustrate three sectional views through the fuselage of the aircraft, whereby the outer surface configuration of the fuselage in the area facing the steering means or strakes is shaped to conform to the steering means or strakes, wherein:

FIG. 5a is a sectional view along section line A—A;

FIG. 5b is a sectional view along section line B—B;

FIG. 5c is a sectional view along section line C—C; and

Figure 5:
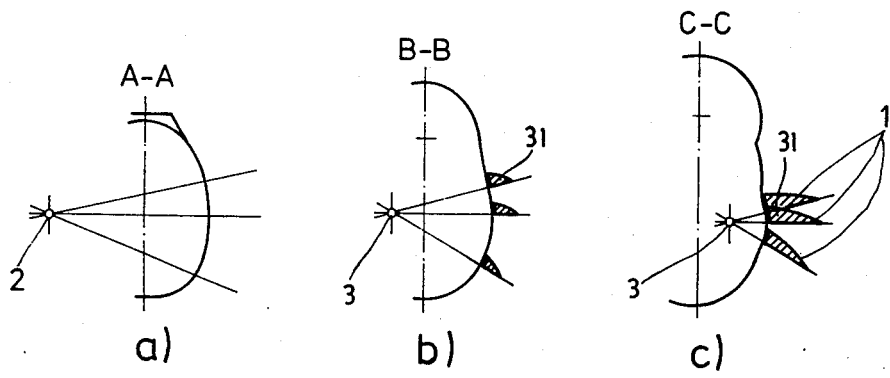
Figure 6:
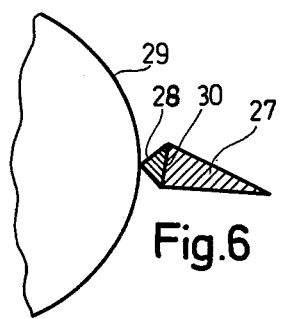

FIG. 6 is a view similar to that of FIG. 5 illustrating the arrangement of a sealing gasket between the fuselage and a strake which gasket permits a movement between the strake relative to the fuselage.

Figure 1:
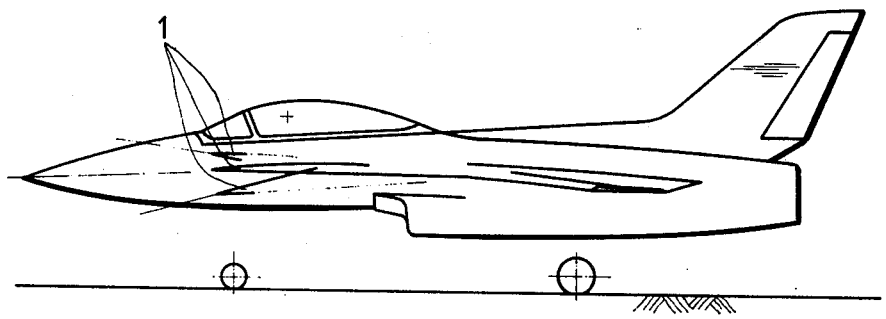
FIG. 1 is a side view of a canard type of aircraft constructed in accordance with the invention.

DETAILED DESCRIPTION OF PREFERRED EXAMPLE EMBODIMENTS:

The side view of FIG. 1 illustrates three different positions of the steering or strake means 1 according to the invention. The intermediate position corresponds to a normal position of the strake means, whereas the upper and lower positions correspond to control deflections of the strake means.

Figure 2:
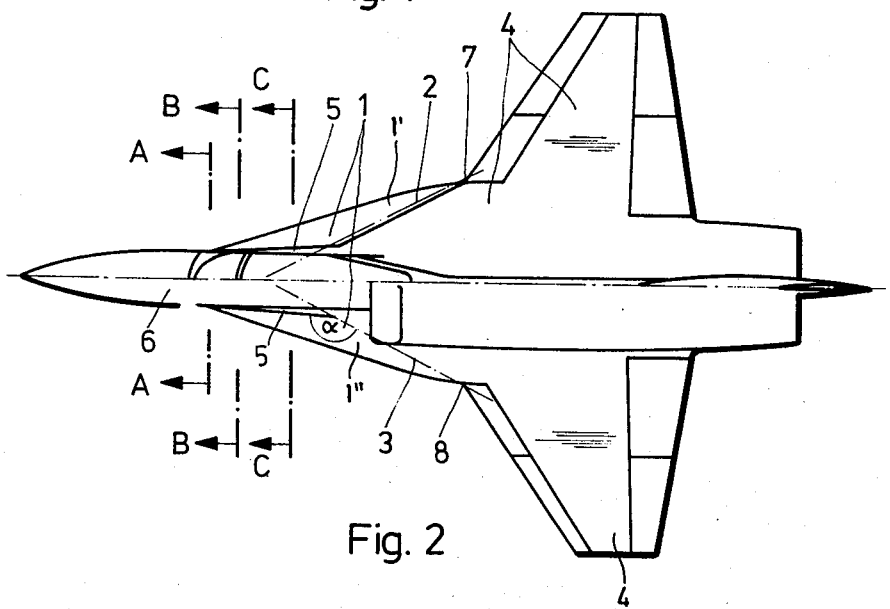
FIG. 2 is a top plan view of a strake wing aircraft according to the invention without tail elevator fins or elevator steering means.

FIG. 2 illustrates a top plan view of an aircraft equipped with a steering device 1 according to the invention. The steering device 1 comprises strakes 1' and 1". The strake 1' is tiltable about the tilting axis 2. The strake 1" is tiltable about the tilting axis 3. These tilting axes 2 and 3 constitute simultaneously boundary lines between the steering means 1 and the respective wing means 4. The edges 5 of the strakes 1', and 1" adjacent to the fuselage 6 conform in their shape closely to the configuration of the respective surface area of the fuselage. This close conformity is best illustrated in FIGS. 5b and 5c.

It will be noted from FIG. 2 that the rotational axis 2 extends through the point 7 whereas the rotational axis 3 extends through the point 8. These points 7 and 8 define a discontinuity in the leading edge of the respective wing means. Normally, the structures according to the invention will be such, that the tip of a cone defined by the rotation of the respective strakes 1', and 1" will be located outside the fuselage of the aircraft. The points 7 and 8 illustrate this statement. The just mentioned cone has a central longitudinal axis which coincides with the respective tilting or rotational axis 2 or 3.

It will be further noted from FIG. 2, that each strake 1' and 1" has two edges, namely, an edge 5 closely conforming to the surface configuration of the fuselage and a further edge extending along the respective wing. These two edges include an obtuse angle α as shown in FIG. 2.

Figure 3:
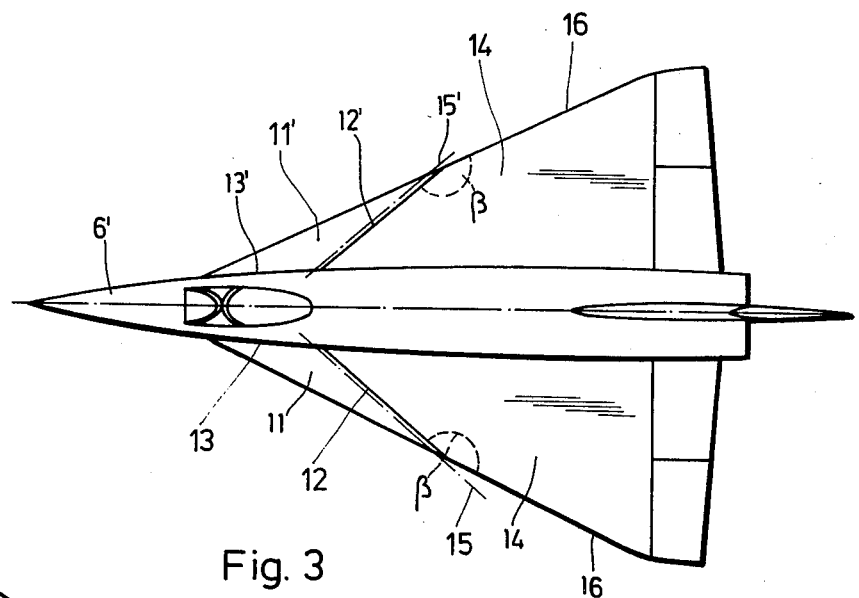
FIG. 3 illustrates a top plan view of a delta type of aircraft, wherein the strake type elevator steering means is completely integrated into the geometry of the delta wings.

FIG. 3 illustrates an embodiment in which the canard type of aircraft has delta wings 14, the front section of which is constructed to form strakes 11 and 11'. The two steering elements or strakes 11 and 11' are completely integrated into the outline of the delta wings. Thus, the edge 13 of the strake 11' conforms closely to the surface configuration of the fuselage 6' and the edge 12 which simultaneously constitutes the rotational axis 15 of the strake 11', conforms closely to the leading edge of the respective delta wing 14. Similarly, the edge 13' of the steering element 11' also conforms closely to the respective surface configuration of the fuselage 6' while the edge 12' conforms closely to the respective leading edge of the right wing portion. The tilting axis 15' coincides with the edge 12' and the leading edge of the wing. Thus, the steering means 11, 11' operate as strakes and as elevator rudder means. Accordingly, the invention achieves the advantage that elevator rudder or fin means are not necessary anymore in the tail portion of the aircraft. Incidentally, the rotational axis 15 and the rotational axis 15' on the one hand form an obtuse angle β with the respective outer edge 16 of the delta wings 14.

Figure 4:
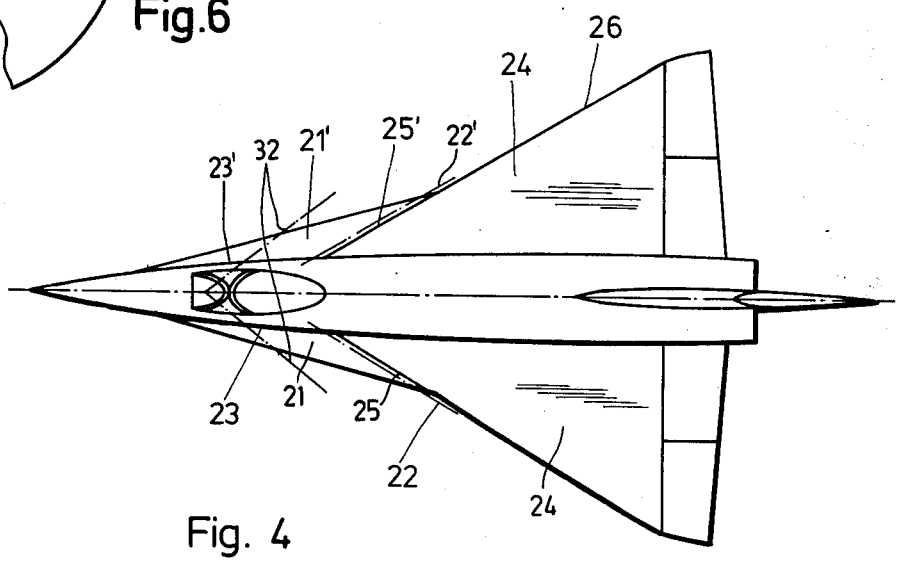
FIG. 4 is a top plan view of a delta type of aircraft in which the elevator steering means are not completely integrated into the geometry of the delta wings to thereby form a double delta type of appearance.

FIG. 4 illustrates a double delta configuration of a canard type of aircraft. The steering elements 21 and 21' form their own delta configuration and so do the wings 24. The rotational axis 25 of the steering element 21 coincides with the rotational axis 22. The same applies with regard to the rear edge 22' and the rotational axis 25' of the steering element 21'. The other edge 23, 23' of the steering elements also closely conforms to the respective surface configuration of the fuselage. The rear edge and rotational axis of each of the steering elements extend in alignment with the leading edge 26 of the respective wing 24. This is contrary to the configuration shown in FIG. 3.

FIG. 6 shows a strake or steering element 27 in a sectional view similar to that of FIG. 5b or 5c, whereby according to the invention a sealing gasket 28 is inserted between the fuselage 29 and the edge 30 of the strake 27. The gasket 28 is made of a durable rubber-elastic material such as neoprene and permits the relative movement between the fuselage 29 and the strake 27 so that the latter may take up the several positions as illustrated in FIG. 5b and FIG. 5c. Incidentally, in the latter two figures a gap 31 is provided between the fuselage and the steering element or strake.

Referring further to FIG. 6, it will be appreciated that the gasket is arranged in such a manner that a proper seal will be accomplished in any of the several positions of the strake relative to the fuselage. In order to facilitate such sealing, the invention also suggests to shape the respective surfaces of the fuselage in the area where in sealing gasket contacts the fuselage in such a manner that the respective surface area of the fuselage forms part of a cone surface, whereby the longitudinal axis of the respective cone coincides with the tilting axis of the respective strake, for example, the tilting axis 3 as illustrated in FIGS. 5b and 5c. In the sectional illustrations of the just mentioned two figures the tilting axis 3 is shown to the left of the center of the fuselage in FIG. 5b and to the right of the center of the fuselage in FIG. 5c thereby indicating the slanting of the tilting axis 3 as best seen in FIG. 2. By the just described features it has become possible according to the invention to maintain the edge of the steering or strake element close to the fuselage in all positions, whereby the respective cross sections through the fuselage from elliptical sections which provides the structural advantage that the natural cross section through the fuselage corresponds substantially to an ellipsis.

In the present context it is advantageous if the gap between the facing edge of the steering or strake element and the fuselage is substantially constant and relatively narrow. Such a narrow gap of constant width has no disadvantageous effects on the arodynamic characteristics of the aircraft. As mentioned, and if desired, the gap may be closed by a rubber elastic sealing element 28 as shown in FIG. 6, whereby again it is advantageous to maintain the width of the gap constant along the entire length of the gap. Preferably, the sealing element 28 is secured to the strake and slides along the fuselage surface when the strake is adjusted to the several positions illustrated, for example, in FIG. 1 and in FIGS. 5b and 5c.

Where the steering means or strakes have hard surface configurations it may be advantageous according to the invention to subdivide the strakes or steering means into several elements and to provide a plurality of tilting axes for these elements, whereby the elements would be interconnected through respective hinges.

Thus, it is possible to adjust continuous camber shapes when tilting the strake (axes 32 in FIG. 4).

According to the invention it is also possible to combine the control for the steering means arranged alongside the leading edge of the wing means with the control of the steering means arranged alongside the trailing edge of the wing means, whereby it is an advantage to obviate the elevator rudder at the aircraft tail altogether. Thus, the expenses normally necessary for the steering and control means are reduced according to the invention.

Another advantage of the invention is seen in that it provides an improvement in the rolling control. The classical rolling control of an aircraft is based on a differential lift variation at both wings. Contrary thereto, according to the invention, the power supply to the strake or to the steering means turbulence on both sides of the fuselage is controlled differentially. The advantage of this type of rolling control through the strakes is seen in that for small angles of incidence or attack as they are used predominantly during very high speed flights it permits avoiding the high effect of the aileron or wing flap by switching off the latter. On the other hand, for large angles of attack or incidence during slow speed flight, it is possible to still produce control moments, whereby the ailerons or wing flaps merely have a very small effect or none at all. Although specific example embodiments have been described above, it will be appreciated, that it is intended, to cover all modifications and equivalents within the scope of the appendec claims.

What is claimed is:

1. A canard type aircraft comprising fuselage means (6) having a longitudinal axis, wing means (4) operatively secured to said fuselage means, steering means (1', 1") operatively secured to said wing means so that said steering means are tiltable about a tilting axis extending at an acute angle relative to said longitudinal axis of said fuselage means (6), said steering means (1', 1") each comprising a first edge (5) facing the aircraft fuselage means (6), and a second edge (2, 3) facing the respective wing means (4), said first and second edges (2, 5; 3, 5) including an obtuse angle ($\alpha$), said second wing means facing edge (2, 3) substantially defining said tilting axis, said fuselage means (6) having surface areas facing the first edge (5) of the respective steering means (1', 1"), said first edge having a shape substantially conforming to the shape of the respective fuselage surface area facing said first edge, said first edge being movable relative to said fuselage, whereby an effective sealing between said fuselage means and said first edge (5) facing said fuselage means (6) may be maintained substantially in all positions of said first edge relative to said fuselage means.

2. The aircraft of claim 1, wherein said first edge extends substantially in parallel to said longitudinal fuselage axis.

3. The aircraft of claim 1, wherein said fuselage surface areas facing said first edge form part of the surface of a cone, said cone having a central longitudinal axis coinciding with said tilting axis (3).

4. The aircraft of claim 1, further comprising a gap of substantially constant width between said fuselage area and the respective first edge of said steering means.

5. The aircraft of claim 4, further comprising sealing means operatively interposed in said gap.

6. The aircraft of claim 1, wherein said tilting axis means comprise a plurality of tilting axes.

7. The aircraft of claim 1, wherein said wing means have leading and trailing edges, and wherein said steering means comprise first and second rudder members, said first rudder members being tiltable about said tilting axis means extending substantially along the leading edge of said wing means, said second rudder members being tiltable substantially about the trailing edge of said wing means, and wherein said first and second rudder members are controllable in combination.

* * * * *